(12) United States Patent
Tucker

(10) Patent No.: US 8,231,060 B2
(45) Date of Patent: Jul. 31, 2012

(54) TIRE ANTENNA FOR RFID

(75) Inventor: Randall L. Tucker, Findlay, OH (US)

(73) Assignee: Cooper Tire & Rubber Company, Findlay, OH (US)

( * ) Notice: Subject to any disclaimer, the term of this patent is extended or adjusted under 35 U.S.C. 154(b) by 142 days.

(21) Appl. No.: 12/660,418

(22) Filed: Feb. 26, 2010

(65) Prior Publication Data

US 2011/0000969 A1 Jan. 6, 2011

Related U.S. Application Data

(60) Provisional application No. 61/270,079, filed on Jul. 2, 2009.

(51) Int. Cl.
*G06K 19/06* (2006.01)

(52) U.S. Cl. ........ 235/492; 235/439; 235/449; 235/451; 235/487

(58) Field of Classification Search .................. 235/487, 235/492, 439, 449, 451, 493
See application file for complete search history.

(56) References Cited

U.S. PATENT DOCUMENTS

| | | | |
|---|---|---|---|
| 5,500,065 A * | 3/1996 | Koch et al. ................ | 156/123 |
| 5,562,787 A | 10/1996 | Koch et al. | |
| 5,741,966 A | 4/1998 | Handfield et al. | |
| 6,062,072 A | 5/2000 | Mock et al. | |
| 6,147,659 A * | 11/2000 | Takahashi et al. ........... | 343/866 |
| 6,546,982 B1 * | 4/2003 | Brown et al. .............. | 152/152.1 |
| 6,725,713 B2 | 4/2004 | Adamson et al. | |
| 6,788,192 B2 | 9/2004 | Shimura | |
| 6,791,457 B2 | 9/2004 | Shimura | |
| 6,807,853 B2 | 10/2004 | Adamson et al. | |
| 6,856,245 B2 | 2/2005 | Smith et al. | |
| 6,897,770 B2 | 5/2005 | Lill | |
| 7,009,576 B2 | 3/2006 | Adamson et al. | |
| 7,186,308 B2 | 3/2007 | Metcalf et al. | |
| 2004/0224135 A1 * | 11/2004 | Krebs ........................ | 428/195.1 |
| 2005/0076982 A1 * | 4/2005 | Metcalf et al. ............. | 152/152.1 |
| 2005/0093761 A1 * | 5/2005 | King et al. ................... | 343/873 |
| 2005/0099283 A1 * | 5/2005 | Johnson et al. .............. | 340/447 |
| 2006/0180647 A1 * | 8/2006 | Hansen ........................ | 235/375 |
| 2006/0238356 A1 * | 10/2006 | Tucker ....................... | 340/572.8 |
| 2006/0250250 A1 * | 11/2006 | Youn .......................... | 340/572.7 |
| 2006/0290505 A1 * | 12/2006 | Conwell et al. ............ | 340/572.1 |
| 2007/0279202 A1 * | 12/2007 | Lionetti ....................... | 340/447 |
| 2008/0119957 A1 | 5/2008 | Ellis | |
| 2009/0015415 A1 * | 1/2009 | Uehara et al. .............. | 340/572.8 |
| 2010/0108211 A1 * | 5/2010 | Fenkanyn ................. | 152/152.1 |

\* cited by examiner

*Primary Examiner* — Ali Sharifzada
(74) *Attorney, Agent, or Firm* — Emch, Schaffer, Schaub & Porcello Co., LPA

(57) ABSTRACT

An RFID device for tires includes first and second sheets non-conducting insulation material having positioned therebetween a semi-conductor chip and a wireless antenna formed of electrically conducting ink printed on one of said sheets.

6 Claims, 3 Drawing Sheets

US 8,231,060 B2

TIRE ANTENNA FOR RFID

CROSS REFERENCE TO RELATED APPLICATION

This application is based upon and claims the benefit of U.S. Provisional Application No. 61/270,079 filed Jul. 2, 2009.

BACKGROUND OF THE INVENTION

The use of radio frequency identification devices (RFID) in tires is gaining in popularity. See for example my issued U.S. Pat. No. 7,504,947. Other devices, including RFID devices, which may be incorporated on a surface of or within the structure of a tire for monitoring various functions relative to the tire include the following U.S. Pat. Nos. 5,562,787; 5,741,966; 6,062,072; 6,856,245; 6,897,770; 7,009,576; and 7,186,308. The disclosures contained in these patents are incorporated herein by reference.

U.S. Pat. No. 7,009,576 discloses a tire having a radio frequency antenna embedded therein. Since the rubber in which the radio frequency antenna is embedded is in a mixture of rubber and the conductive dielectric material carbon black, the patent discloses the use of an insulating layer, which is attached to the antenna by an adhesive coating, to insulate the antenna from the conductive dielectric rubber. Although U.S. Pat. No. 7,009,576 does not specifically identify the material from which the antenna is manufactured, typically, the antenna will be a conductive metal wire or a thin sheet of metal foil such as copper as disclosed in U.S. Pat. No. 5,562,787 or 6,147,659.

SUMMARY OF THE PRESENT INVENTION

The present invention utilizes an antenna which is embedded along with a computer chip in the body of a tire or affixed to the inner surface of the tire. The antenna is formed of an electrically conductive ink having a formulation which includes carbon and silver and is encapsulated in insulation formed by a pair of non-conducting rubber sheets adhered together. The insulation preferably is a non-conducting rubber but could be other materials having properties suitable for integration within the rubber tire. Other materials which may be utilized for the insulation include an elastomer or rubber minus the carbon black which is the conductive component. The insulation isolates the antenna from the dielectric rubber of the tire and, thereby, prevents the conductive rubber from dissipating the energy being conducted by the antenna.

IN THE DRAWINGS

DETAILED DESCRIPTION OF THE INVENTION

Figure 1:
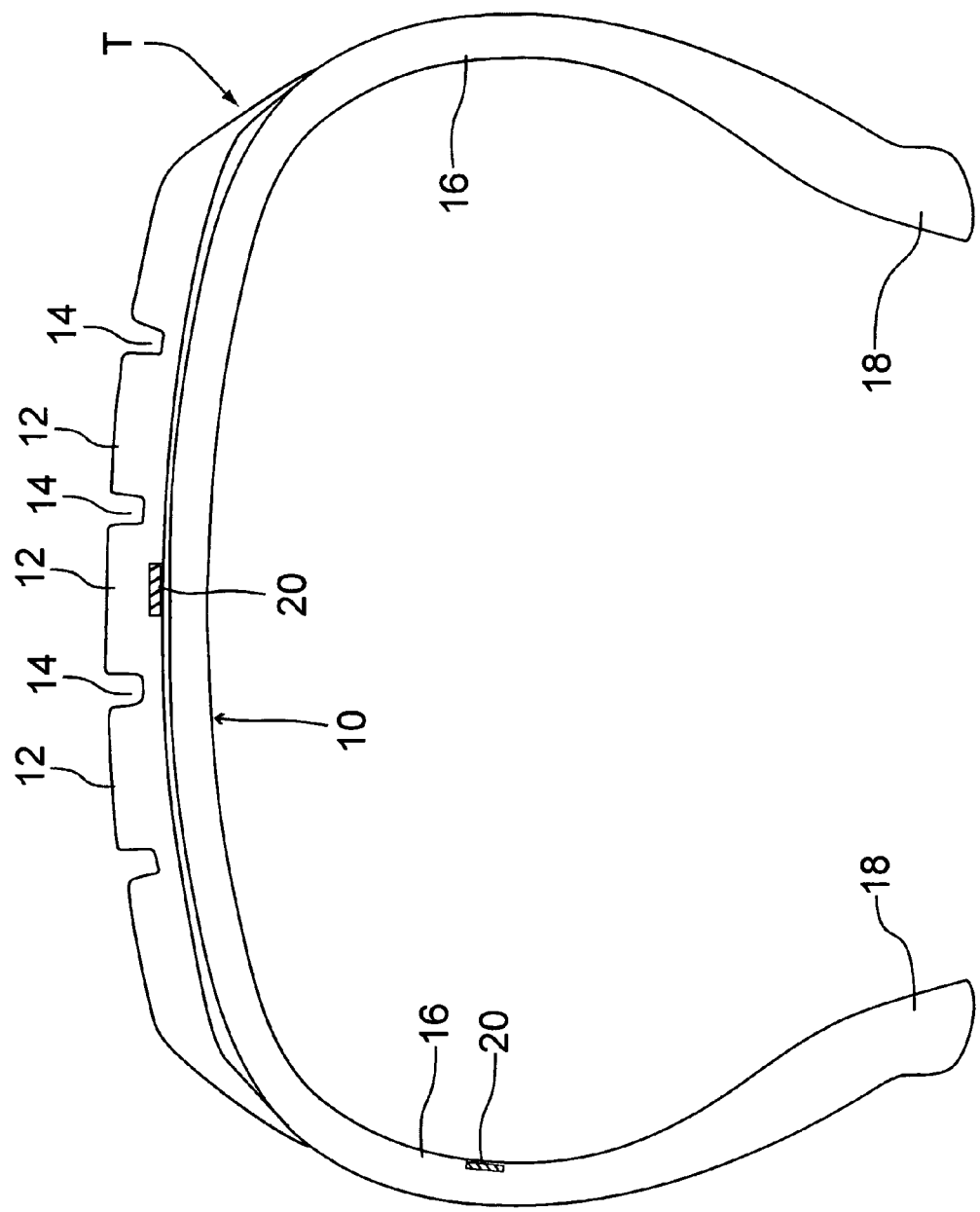
FIG. 1 is a sectional view of a tire showing an RFID device with the antenna of the present invention encapsulated therein.

Referring to FIG. 1 there is shown a tire T having a crown 10 with external treads 12 and grooves 14. In cross-section the tire T has the crown 10 extending radially outwardly along an arcuate path to a pair of oppositely disposed sidewalls 16 which define the maximum radial extent of the tire T. The sidewalls 16 curve inwardly from such maximum radial extent to a narrower area terminating at a pair of oppositely disposed beads 18. As shown in FIG. 1 there is provided an RFID device 20 of the present invention which is permanently embedded either in the crown 10 or in one of the sidewalls 16. It may also be adhered to the inner surface of the tire in the area of the crown 10 or the sidewall 16.

Figure 2:
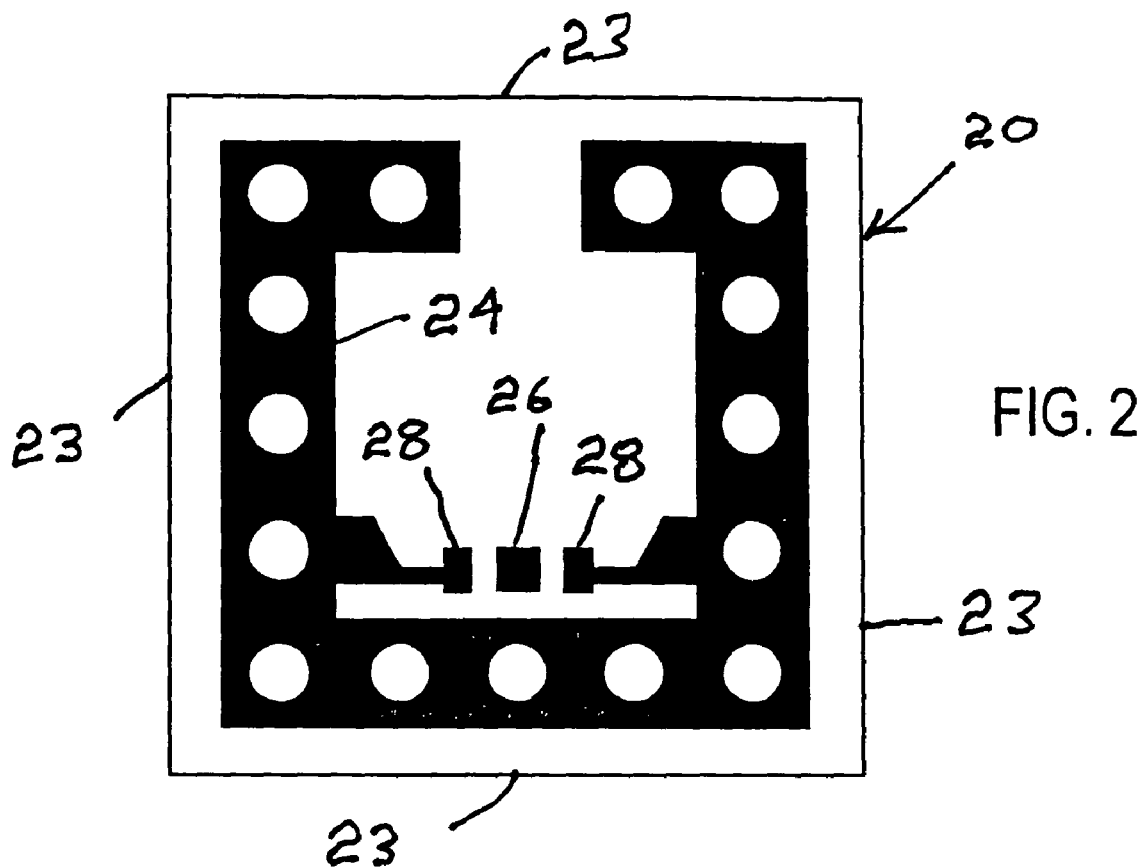
FIG. 2 is a plan view showing one form of antenna with a computer chip encapsulated between two layers of insulation material.
Figure 3:
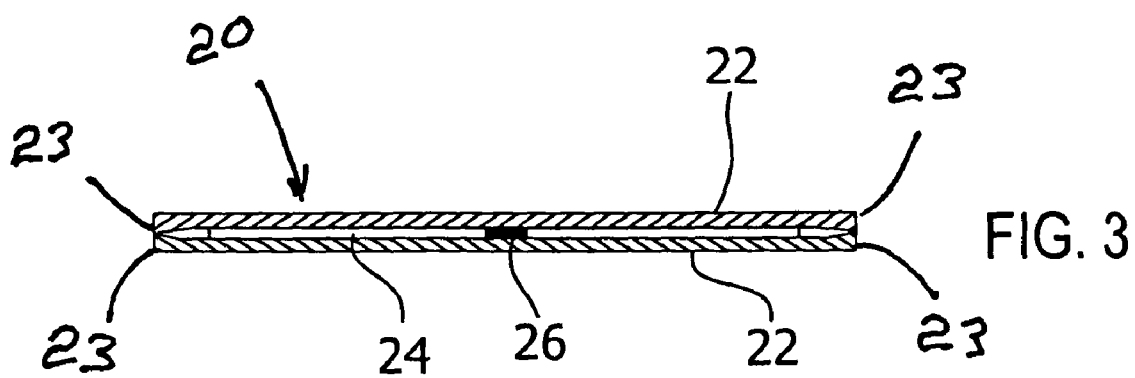
FIG. 3 is a sectional view of the assembly shown in FIG. 2.

Referring to FIGS. 2 and 3, the RFID device includes a pair of insulation members 22 and an antenna 24 encapsulated therebetween. A semiconductor microchip 26 such as one manufactured by NXP as its item SL3S1001FTT is attached to tabs 28 of the antenna 24. The insulation members 22 may be formed of any of a number of non-conductive or low conductive materials such as those specified above and having a dielectric constant of about 4 or less. The insulation members 22 have a thickness in the range of 0.05 mm to 3 mm, where mm is millimeters.

As can be seen in FIG. 3, the edges 23 of the opposing insulation members 22 are sealed together completely around the periphery of the assembly at edges 23 to thereby encapsulate the antenna 24 and the chip 26. Preferably, the insulation members are formed of non-conductive green (non-vulcanized) rubber. When manufactured of green rubber, the edges 23 of the opposed insulation members 22 will adhere together without the necessity of providing any adhesive therebetween. When green rubber is used for the insulation, the insulation members 22 can be sealed together simply by pressing together the edges of the opposed members 22. If the insulation members 22 are formed of a material other than green rubber the edges can be heat sealed or adhesively joined together.

The conductive ink is printed directly on one of the insulation members 22 which is then cured for 8 to 12 minutes at a temperature of 90° to 130° C. and preferably for 10 minutes at 100 degrees C., thus curing the ink. The chip 26 is then installed and the other insulation member 22 is affixed thereto over the antenna 24 and chip 26 and the edges 23 of such joined insulation members 22, 22 are sealed together thereby encapsulating the antenna 24 and chip 26 there between.

The thickness of the ink is in the range of 0.0006 to 0.34 mm. with a preferred average thickness of about 0.011 mm. The conductive ink is formulated on a custom basis as set forth herein using conductive inks of the type manufactured and distributed by Engineered Conductive Materials, LLC (ECM), Delaware, Ohio. Among the inks used in formulating the ink for the antenna 24 of the present invention are ECM's product numbers Cl-1036 silver/proprietary resin, Cl-2001 carbon/vinyl and Cl-2014 carbon/vinyl.

Inks of the above type are mixed to provide a solution having a preferred range of about 80% silver resin to about 20% carbon/vinyl. An antenna suitable for the intended purpose of the present invention could have 100% silver resin and 0 carbon. However, from the standpoint of economics, it is preferred to have lower amounts of silver resin because the cost of silver resin is significantly higher than the cost of carbon/vinyl ink. From a practical standpoint in providing in ink on an economical basis with suitable properties for the tire antenna of the present invention, the silver resin of the ink formulation should be at least 75% with no more than 25% carbon/vinyl. The higher the percentage of concentration of silver resin in the solution forming the ink, the more conductive will be the antenna.

Even with an ink formulation having a very high percentage of silver resin, the cost of producing an RFID device utilizing the ink antenna of the present invention is significantly less than the cost of manufacturing a conventional RFID device with copper or other metal for the antenna. Thus, the cost of a conventional RFID devices copper antenna could be approximately twenty cents per device. This compares with the cost of an RFID device manufactured using the antenna as set forth in the present invention of approximately one to two cents per device.

In preparing the RFID device using the antenna 24 of the present invention, after formulating, the ink formulated as set forth above is printed onto a surface of one of the insulation members 22 in the thickness range set forth above. The semiconductor microchip 26 is then positioned between the tabs 28 of the antenna 24 and a second insulation member 22 is engaged to the first insulation member 22 with the antenna 24 and semi-conductor microchip 26 therebetween. The assembly is then cured for 5-10 minutes by heating to approximately 110° C. Such curing causes the second insulation member 22 and its edges 23 to become adhered to the first insulation member 22 and its edges 23 thereby encapsulating the antenna 24 and semi-conductor microchip 26 therebetween. FIG. 2 shows one possible configuration of an antenna 24.

Figure 4:
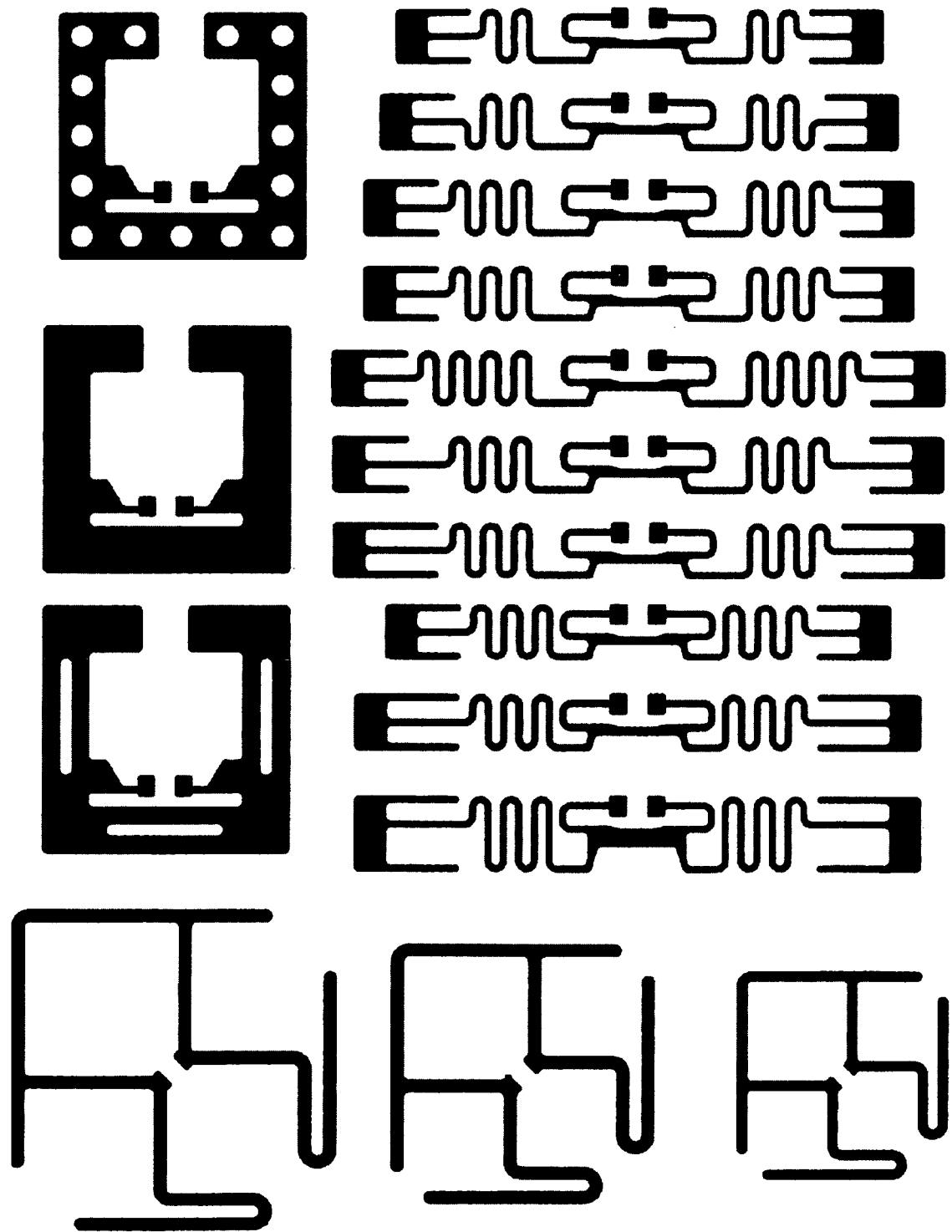
FIG. 4 is a view showing various configurations of antennae formed using electrically conductive ink.

FIG. 4 is a view showing various configurations of antennae formed with one of the ink formulations disclosed herein. Thus, in FIG. 4, each of the configurations of antenna shown in the right column has a higher resistance than antenna having configurations shown in the left column. In the right column, the resistance of the respective antenna is higher the further down the column it is located, however some of that variation may due to differences in the formulation and/or the thickness of the applied ink forming the antenna. Those antenna in the bottom row generally have a resistance higher than those in the left row by lower than those shown in the right column.

For the antennae shapes shown in FIG. 4 produced from ink of 100% silver resin the resistance was less than 1 ohm for those shapes shown in the left column to slightly over 2 ohms for those shapes shown in the right column. For antenna shapes shown in FIG. 4 produced with ink of 75% silver, there is also a variation of resistance.

It can be readily seen from the foregoing, that it is possible to vary the ohms of resistance for the various shapes of antennae by varying the amount of silver used in the solution used for forming the antenna of the RFID device of the present invention and by varying the shape. The various antenna shapes include a pair of tabs 28 each of which is engaged to the chip 26 and each of which has extending therefrom linear and/or arcuate sections.

For the RFID device of the present invention it is preferred that the antenna have a resistance in the range of 200-300 ohms; however, it could have a range as great as 1 ohm to 500 ohms.

Antennae that have lower resistances and match the impendence of the RFID chip provide a long range of transmission.

The RFID device of the present invention is one which is economical to manufacture and can be provided with an antenna ink formulation and configuration to provide one of a number of levels of resistance tailored to the specific requirements of the device.

I claim:

1. A radio frequency identification device (RFID) for tires comprising:
    (a) a first sheet of non-conducting insulation material having a peripheral edge;
    (b) a semiconductor chip mounted on said first sheet spaced from said edge;
    (c) a second sheet of non-conducting insulation material overlying said semiconductor chip and having an annular portion sealingly engaged to said peripheral edge; and,
    (d) a wireless antenna operatively engaged to said semiconductor chip mounted on said first sheet or said second sheet, said antenna being electrically conducting ink with a thickness in the range of 0.0006 mm to 0.34 mm and having a formulation which includes 75% to 100% silver resin and up to 25% carbon/vinyl and a resistance in the range of 200 ohms to 300 ohms;
    said wireless antenna being located between said first and second sheets, all portions of said first and second sheets except those portions overlying said antenna and said semiconductor chip being sealed together.

2. The RFID device of claim 1 wherein said first and second sheets are formed of green rubber.

3. The RFID device of claim 1 wherein said antenna includes a pair of tabs engaged to said semiconductor chip and having extending therefrom linear and/or arcuate antenna sections.

4. The RFID device of claim 1 wherein said antenna ink has a formulation in the range of 75% to 80% silver resin and 20% to 25% carbon/vinyl.

5. A method for manufacturing a radio frequency identification device (RFID) for tires comprising the steps of:
    (a) providing a first sheet of non-conducting insulation material;
    (b) mounting a semiconductor chip on said first sheet;
    (c) providing electrically conducting ink with 75% to 100% silver resin and up to 25% carbon/vinyl;
    (d) printing said electrically conducting ink defining an antenna on said first sheet to be operatively engaged to said computer chip with resistance in the range of 200 ohms to 300 ohms;
    (e) curing said ink for at least 10 minutes at a temperature of at least 100° C.;
    (f) engaging a second sheet of non-conducting insulation material overlying said semiconductor chip and antenna; and,
    (g) sealing said second sheet to said first sheet such that all portions of said first and second sheets are joined together except those portions overlying said semiconductor chip.

6. The method of claim 5 wherein green rubber is used in providing said first and second sheets.

* * * * *